United States Patent
He et al.

(10) Patent No.: US 9,698,405 B2
(45) Date of Patent: Jul. 4, 2017

(54) ELECTRIC CONNECTOR AND BATTERY COMPRISING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Yuanyuan He, Shenzhen (CN); Weixin Zheng, Shenzhen (CN)

(73) Assignees: SHENZHEN BYD AUTO R&D COMPANY LIMITED, Guangdong (CN); BYD COMPANY LIMITED, Shenzhen, Guangdong (CN)

( * ) Notice: Subject to any disclaimer, the term of this patent is extended or adjusted under 35 U.S.C. 154(b) by 39 days.

(21) Appl. No.: 14/357,752

(22) PCT Filed: Nov. 23, 2012

(86) PCT No.: PCT/CN2012/085192
§ 371 (c)(1),
(2) Date: May 12, 2014

(87) PCT Pub. No.: WO2013/075663
PCT Pub. Date: May 30, 2013

(65) Prior Publication Data
US 2015/0147637 A1 May 28, 2015

(30) Foreign Application Priority Data
Nov. 25, 2011 (CN) .................. 2011 2 0476506 U

(51) Int. Cl.
*H01M 2/26* (2006.01)
*H01M 2/30* (2006.01)
(Continued)

(52) U.S. Cl.
CPC ............. *H01M 2/263* (2013.01); *H01M 2/24* (2013.01); *H01M 2/30* (2013.01); *H01R 4/48* (2013.01); *H01M 10/0525* (2013.01); *H01M 10/0587* (2013.01); *H01M 2220/20* (2013.01); *H01M 2220/30* (2013.01)

(58) Field of Classification Search
None
See application file for complete search history.

(56) References Cited

U.S. PATENT DOCUMENTS

2003/0091896 A1  5/2003  Watanabe et al.
2009/0162738 A1*  6/2009  Jiang ................... H01M 10/615
429/90

(Continued)

FOREIGN PATENT DOCUMENTS

CN  102208594 A  10/2011
CN  202495505 U  10/2012

(Continued)

OTHER PUBLICATIONS

Shenzhen BYD Auto R&D Company Limited, International Search Report, PCT/CN2012/085192, Mar. 7, 2013, 4 pgs.

*Primary Examiner* — Patrick Ryan
*Assistant Examiner* — Christopher Domone
(74) *Attorney, Agent, or Firm* — Morgan, Lewis & Bockius LLP

(57) ABSTRACT

An electric connector and a battery comprising the same may be provided. The electric connector (3) may comprise a core fixing part and an extension part (32) connected to the core fixing part. The core fixing part may include at least two hosting portions (31) each configured to hold an electrode tab of a winding core of a battery, respectively, and a connection portion (33) configured to connect the two adjacent hosting portions.

11 Claims, 6 Drawing Sheets

(51) Int. Cl.
  *H01R 4/48*      (2006.01)
  *H01M 2/24*      (2006.01)
  *H01M 10/0587*   (2010.01)
  *H01M 10/0525*   (2010.01)

(56) References Cited

U.S. PATENT DOCUMENTS

| | | |
|---|---|---|
| 2010/0190055 A1 | 7/2010 | Khakhalev |
| 2010/0233521 A1* | 9/2010 | Byun .................... H01M 2/263 429/72 |
| 2011/0052976 A1 | 3/2011 | Ishii et al. |
| 2011/0104528 A1 | 5/2011 | Byun et al. |
| 2012/0328924 A1* | 12/2012 | Miyazaki ............. H01M 2/263 429/94 |

FOREIGN PATENT DOCUMENTS

| | | |
|---|---|---|
| EP | 2228852 B1 | 5/2012 |
| EP | 2477257 A1 | 7/2012 |
| JP | S60-23956 A | 2/1985 |
| JP | 10-261441 | 9/1998 |
| JP | 2000-133241 A | 5/2000 |
| JP | 2002-279961 A | 9/2002 |
| JP | 2003-173765 A | 6/2003 |
| JP | 2003-346770 A | 12/2003 |
| JP | 2004-273178 A | 9/2004 |
| JP | 2010-212241 A | 9/2010 |
| KR | 2005-0123366 A | 12/2005 |
| KR | 2007-0055336 A | 5/2007 |
| WO | WO 2011/111661 A1 | 9/2011 |

\* cited by examiner

ELECTRIC CONNECTOR AND BATTERY COMPRISING THE SAME

CROSS-REFERENCE TO RELATED APPLICATIONS

This application is a United States National Stage Application filed under 35 U.S.C. §371 of PCT Patent Application Serial No. PCT/CN2012/085192 filed on Nov. 23, 2012, which claims the benefit of and priority of Chinese Patent Application No. 201120476506.1, filed on Nov. 25, 2011, the entire contents of which are incorporated herein by reference.

FIELD

Embodiments of the present disclosure generally relate to the field of battery, more particularly, to an electric connector and a battery comprising the same.

BACKGROUND

Recently, with the development of battery technology, a battery may be used as power resource in mobile communication equipment, such as portable telephone, laptop and digital camera, as well as robot, hybrid vehicle and electric vehicle, so that the battery is required to have a high capacity. However, in order to increase the battery capacity, the winding core of a battery should be thick. Generally, a plurality of relatively thin winding cores are disposed so as to ensure the saturating effect of electrolyte solution. In this case, the number of positive electrode tab (the exposed part of the positive current collector) and negative electrode tab (the exposed part of the negative current collector) increase, and the whole thickness of the electrode tab also increases, which causes it difficult to weld the electrical connection piece to the tap, thus causing sealing-off and false welding, and deteriorating the rate performance of the battery.

As shown in FIG. 1, the positive electrode tab (or negative electrode tab) 21' of a winding core 20' of a conventional battery is connected to the positive electrode terminal (or negative electrode terminal) of a cover plate via an electrical connection piece 22'. Because the battery may comprise a plurality of winding cores 20', and the positive electrode tab (or negative electrode tab) 21' of each winding core 20' is needed to be connected to the corresponding positive electrode terminal (or negative electrode terminal) of the cover plate via an electrical connection piece 22'.

Conventionally, the electrical connection piece 22' can be welded to only one winding core 20'. With the number of the winding cores 20' increasing, the welding of the electrical connection piece 22' becomes more difficult and sealing-off and false welding may be more serious.

Further, the electrical connection piece 22' is needed to be welded to the positive tap (or negative tap) 21' and the positive electrode terminal (or negative electrode terminal) of the cover plate via ultrasonic welding from a side surface and an ultrasonic welding seam 23' is formed. The ultrasonic welding seam is large and occupies a large area, so that large areas at both ends of the winding core 20' for forming positive electrode tab (the exposed part of the positive current collector) and negative electrode tab (the exposed part of the negative current collector) respectively are needed, which may reduce the volume energy density of the battery.

SUMMARY

Embodiments of the present disclosure seek to solve at least one of the problems existing in the prior art to at least some extent, or to provide a consumer with a useful commercial choice.

According to embodiments of the present disclosure, an electric connector may be provided. With the electric connector, the thickness of the positive electrode tab and negative electrode tab of a battery may be reduced and the welding is easy, thus reducing the sealing-off or false welding and increasing the rate performance of the battery.

According to embodiments of a first broad aspect of the present disclosure, there is provided an electric connector, comprising a core fixing part including at least two hosting portions each configured to hold an electrode tab of a winding core of a battery, respectively, and a connection portion configured to connect the two adjacent hosting portions; and an extension part connected to the core fixing part.

According to embodiments of a second broad aspect of the present disclosure, there is provided a battery, comprising: a shell; a cover plate connected to the shell so as to define an inner space therebetween, electrode terminals disposed on the cover plate; at least two winding cores received in the inner space, and each having a non-coated region configured as an electrode tab and a coated region; and an electric connector mentioned above, wherein the electrode tab is received in the hosting portion of the core fixing part respectively.

The electric connector according to embodiments of the present disclosure has a reasonable structure, can be welded to a plurality of winding cores via laser welding simultaneously, thus reducing the occupancy space of electric connectors in a battery. Furthermore, the electric connector may be welded to the winding core and the cover plate easily, thus avoiding the sealing-off or false welding, increasing the volume energy density of the battery and facilitating the construction of the whole battery.

The above summary of the present disclosure is not intended to describe each disclosed embodiment or every implementation of the present disclosure. The Figures and the detailed description which follow more particularly exemplify illustrative embodiments. Additional aspects and advantages of embodiments of present disclosure will be given in part in the following descriptions, and become apparent in part from the following descriptions, or be learned from the practice of the embodiments of the present disclosure.

DETAILED DESCRIPTION

Figure 1:
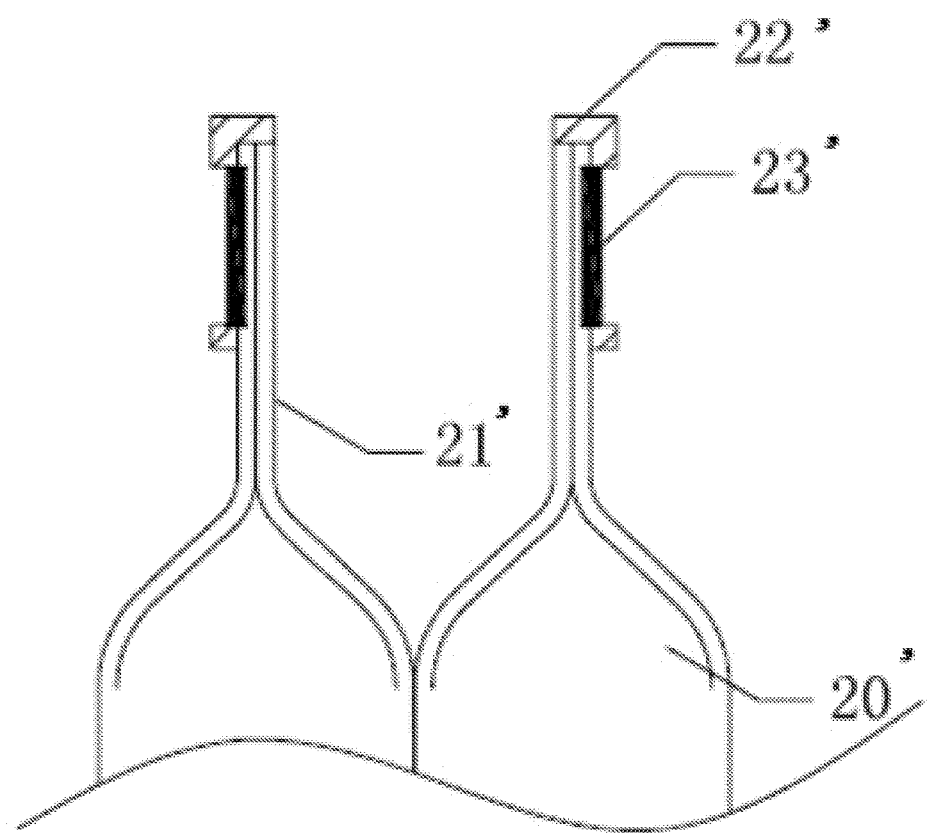
FIG. 1 is a schematic view of an electric connector welded to a winding core in prior art.

Reference will be made in detail to embodiments of the present disclosure. The embodiments described herein with reference to accompanying drawings are explanatory, illustrative, which are used to generally understand the present disclosure. The embodiments shall not be construed to limit the present disclosure. The same or similar elements and the elements having same or similar functions are denoted by like reference numerals throughout the descriptions.

The electric connector according to embodiments of the present disclosure will be described in detail with reference to FIGS. 1-6 below.

The electric connector according to embodiments of the present disclosure may be used for connecting winding core of a battery, and the winding core is well known for a person skilled in the art. As shown in FIG. 1, the winding core may comprise a coated region and a non-coated region, in which the non-coated region may be configured as an electrode tab of the winding core.

Specifically, the winding core may be formed by laminating positive electrode, a separator and a negative electrode in turn and then coiling them. Each of the positive electrode and the negative electrode may comprise a coated region and a non-coated region. The non-coated region of the positive electrode may be configured as a positive winding tab, and the non-coated region of the negative electrode may be configured as a negative winding tab. Then, the positive winding electrode tabs were pressed to be close to each other and thereby to form a positive electrode tab, and the negative winding electrode tabs were pressed to be close to each other and thereby to form a negative electrode tab. The positive electrode tab and the negative electrode tab may be disposed on two sides of the winding core for connecting with the electric connector respectively. This structure of winding core may be mainly used in lithium ion energy storage battery or lithium ion vehicle power battery, which is well known for a person skilled in the art.

Figure 2:
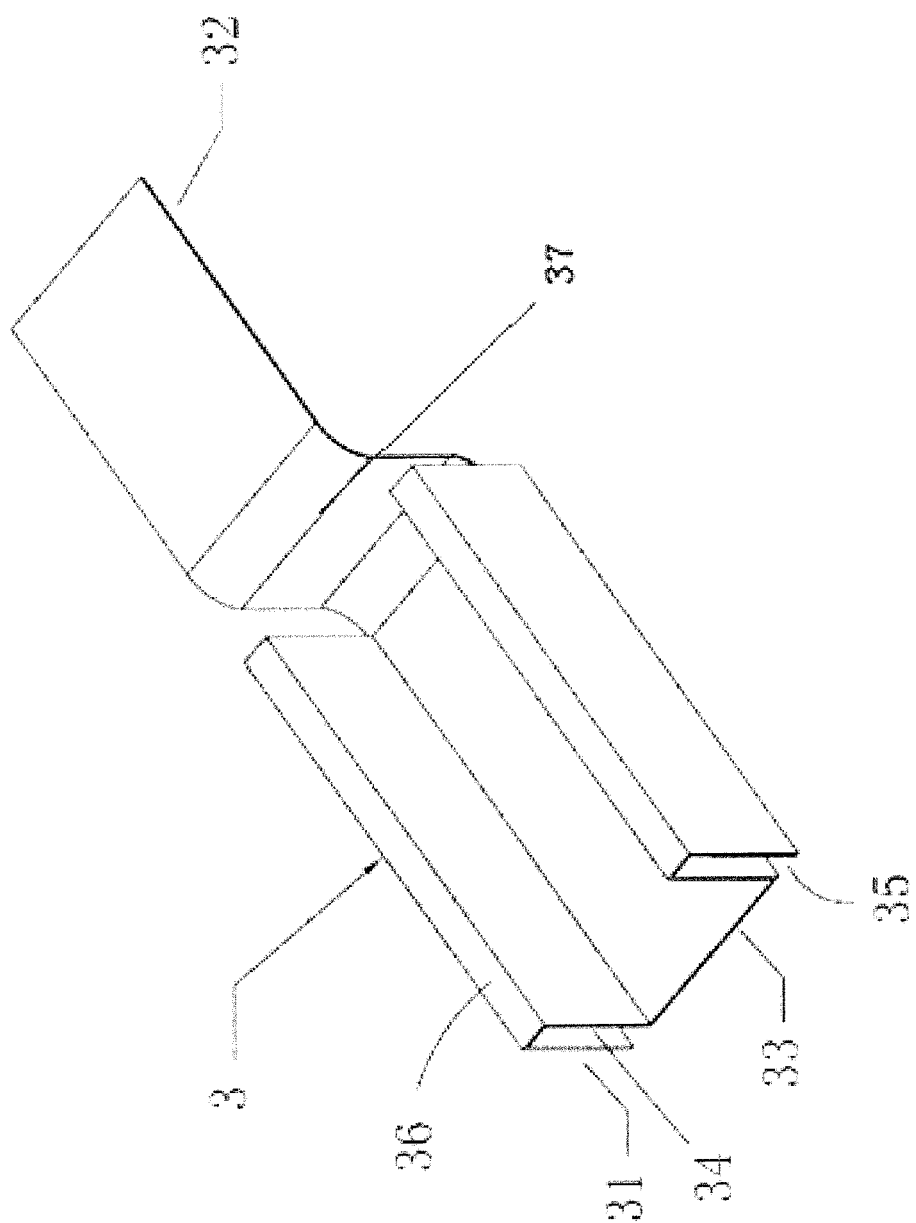
FIG. 2 is a schematic view of an electric connector according to an embodiment of the present disclosure.
Figure 3:
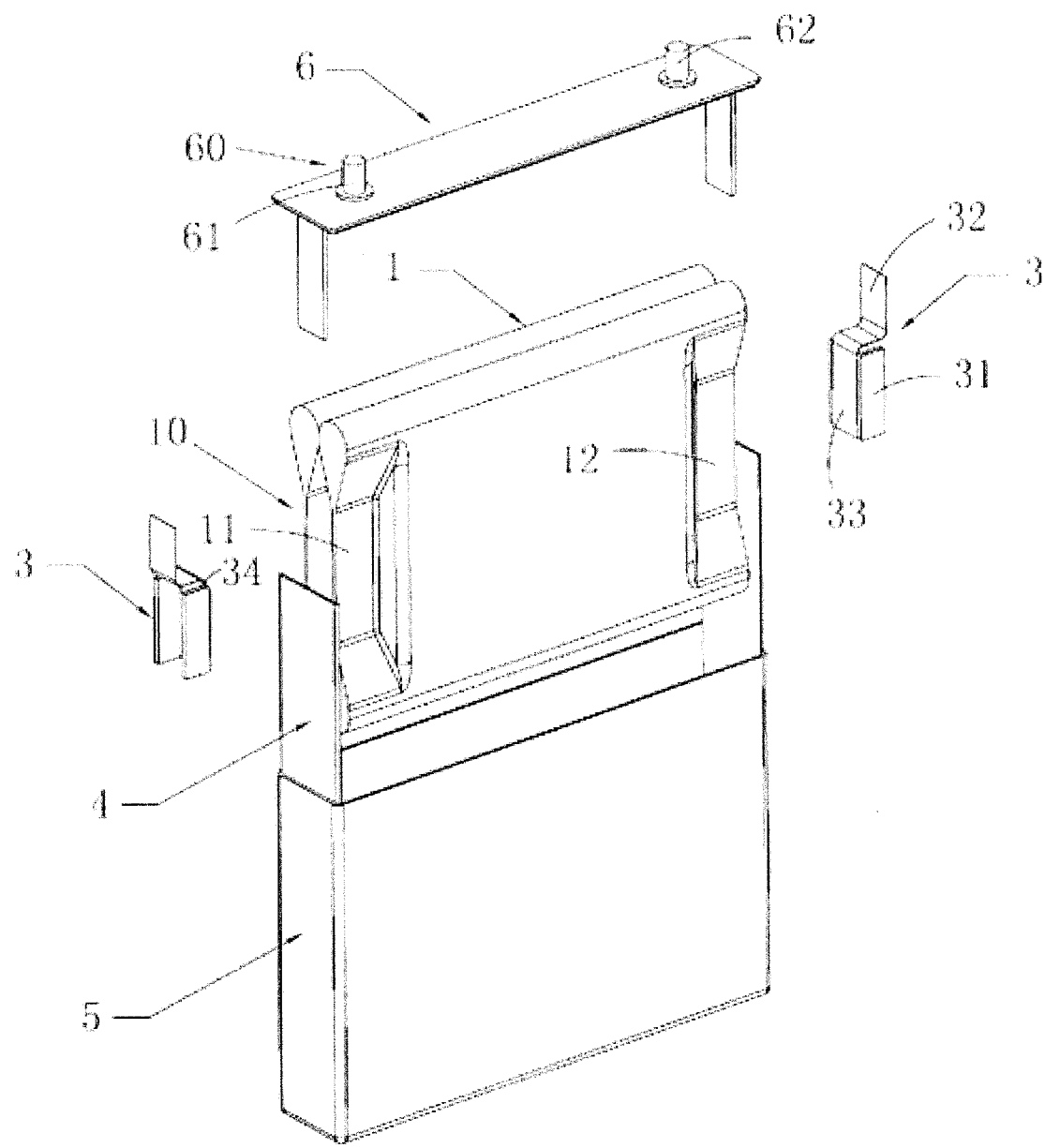
FIG. 3 is an exploded schematic view of a battery according to an embodiment of the present disclosure.

As shown in FIG. 2 and FIG. 3, in an embodiment of the present disclosure, the electric connector 3 may comprise a core fixing part and an extension part 32 connected to the core fixing part. The core fixing part includes at least two hosting portions 31 each configured to hold an electrode tab 10 of two adjacent winding cores 1 of a battery, and a connection portion 33 configured to connect the two adjacent portions 31. The extension part 32 is used to connect to the electrode terminal 60 of the cover plate 6 of the battery.

By holding the electrode tabs of the winding cores in the hosting portions 31 of the core fixing part respectively, and connecting the extension part 32 with the electrode terminals 60 respectively, the two winding cores 1 may be electrically connected to the cover plate 6 via the electric connector 3.

In some embodiments of the present disclosure, the core fixing part comprises two hostings 31 disposed at two sides of the connection portion 33 and configured to hold electrode tabs of two adjacent winding cores respectively, and the extension part 32 is disposed at a first end (the right end in FIG. 2) of the connection portion 33.

In some embodiments of the present disclosure, the two hosting portions 31 may be disposed at two sides of the connection portion 33. The hosting portions 31 may have a substantially U-shaped cross section so as to define a groove 34 to receive and hold the electrode tab 10 of the winding core 1. Because of the groove 34, the electrode tab 10 of the winding core 1 can be received and hold steadily, so that the top surface of the hosting 31 can be easily welded to the upper surface of the electrode tab 10 via laser welding.

In some embodiments of the present disclosure, the hosting portion 31 may have an open end 35 and a closed end 36, and the connection portion 33 and the open end 35 are coplanar. The extension part 32 is connected to the first end of the connection portion 33 via a transition part 37 having a substantially S-shape, and the extension part 32 and the closed end 36 are coplanar. Both front and rear ends of the hosting portion 31 are opened. The transition part 37 and the connection portion 33 are formed integrally.

With this structure, the arrangements of the extension part 32 and the connection portion 33 are reasonable, and the connection portion 33 is disposed between two adjacent winding cores 1 after assembling, while the extension part 32 extends to the electrode terminal 60 of the cover plate 6. As a result, the extension part 32 can be welded to the electrode terminal 60 of the cover plate 6 via laser welding easily for transmitting the current from the two winding cores 1 to the cover plate 6.

In some embodiments of the present disclosure, the electric connector 3 may be made by an elastic sheet, such as a metal sheet of copper, copper alloy, aluminum, aluminum alloy, nickel, nickel alloy. It should be noted that the material of the electric connector 3 is not limited to the sheet of above materials, the electric connector 3 may be made from any other materials having good electrical conduction performance. The thickness of the elastic sheet may be about 0.1 mm to about 3 mm.

It can be understood that the electrode tab 10 may comprise a positive electrode tab 11 and a negative electrode tab 12, and the two electrode tabs 10 connected to each other by the electric connector 3 should have the same polarity, for example the two electrode tabs should be two positive electrode tabs 11 or two negative electrode tabs 12.

In some embodiments of the present disclosure, the electrode terminals 60 disposed on the cover plate 6 may comprise a positive electrode terminal 61 and a negative electrode terminal 62. The positive electrode terminal 61 and the negative electrode terminal 62 are corresponding to the positive electrode tab 11 and negative electrode tab 12 respectively. for example, when a positive electrode tab 11 of the winding core 1 is received and held in the hosting portions 31 of electric connector 3, the extension part 32 should be connected to the positive electrode terminal 61 of the cover plate 6. Alternatively, when a negative electrode tab 11 of the winding core 1 is received and held in the hosting portions 31 of electric connector 3, the extension part 32 should be connected to the negative electrode terminal 61 of the cover plate 6.

According to embodiments of the present disclosure, the cross section of the hosting portions 31 may not be limited to the U-shape, and can be any suitable shapes which can receive and hold tab 10 of the winding core 1 stably.

As shown in FIGS. 3-6, the battery of an embodiment of the present disclosure may comprise a shell 5, a cover plate 6, electrode terminals 60, at least two winding cores 1, and an electric connector 3.

The cover plate 6 is connected to the shell 5 so as to define an inner space therebetween. The electrode terminals 60 are disposed on the cover plate 6. The at least two winding cores 1 were received in the inner space and each has a non-coated region configured as an electrode tab 11/12 and a coated region.

The electric connector 3 may comprise a core fixing part and an extension part 32 connected to the core fixing part. The core fixing part includes two hosting portions 31 and a connection portion 33. Each hosting portion 31 is configured to hold an electrode tab 10 of a winding core 1 of the battery, and the connection portion 33 is configured to connect the two adjacent hosting portions 31. Each of the electrode tabs 11, 12 of the winding cores 1 is received in the hosting portion 31 of the core fixing part, and each extension part 32 of the electric connector 3 is connected to the electrode terminal 60.

Figure 4:
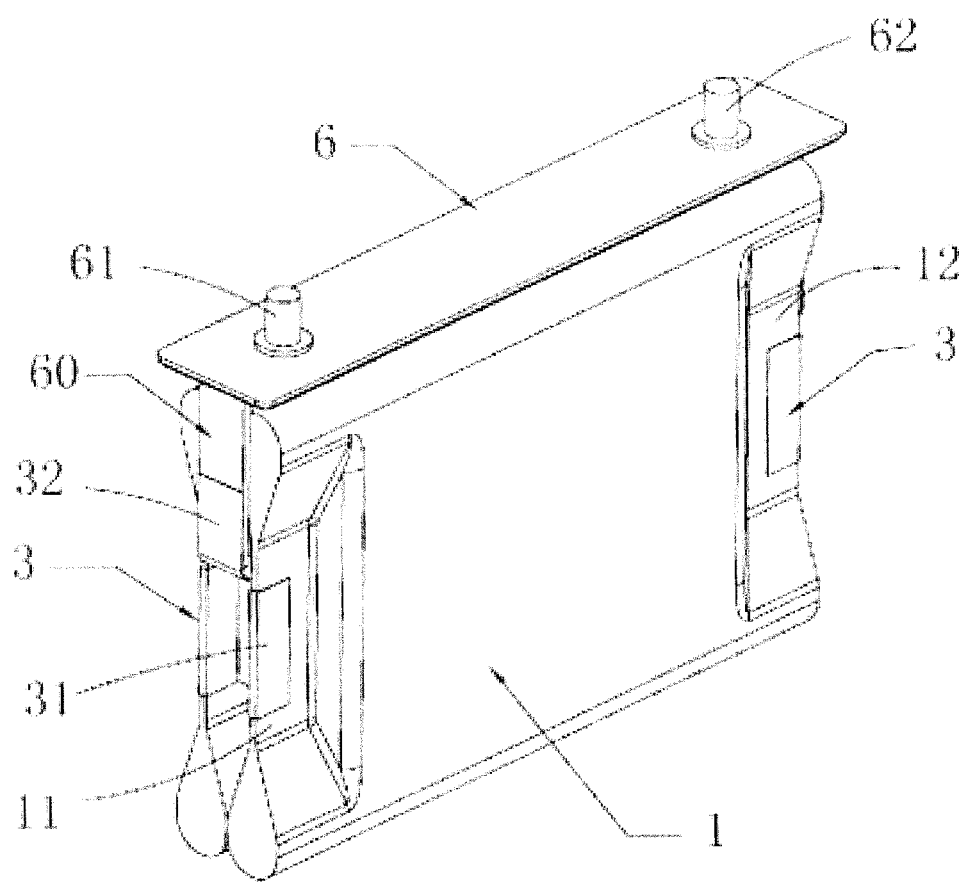
FIG. 4 is a schematic view of a battery according to an embodiment of the present disclosure.

As shown in FIG. 4, in some embodiments of the present disclosure, the cover plate 6 may comprise a negative electrode terminal 62 and a positive electrode terminal 61. The electrode tabs of each winding core 1 comprises a negative electrode tab 12 disposed adjacent to the negative electrode terminal 62 and a positive electrode tab 11 disposed adjacent to the positive electrode terminal 61.

The battery may comprise two electric connectors 3 described above, one electric connector 3 may connect the positive electrode tab 11 of two winding cores 1 to the positive electrode terminal 61 of the cover plate 6 and the other electric connector 3 may connect the negative electrode tab 11 of two winding cores 1 to the negative electrode terminal 61 of the cover plate 6, such that the current can be transmitted from the two winding cores 1 to the cover plate 6.

As shown in FIGS. 3-6, in some embodiments of the present disclosure, the two hosting portions 31 may be disposed at two sides of the connection portion 33. The two hosting portions 31 may have a substantially U-shaped cross section so as to define a groove 34 to receive and hold the electrode tab 10 of the winding core 1. The groove 34 can receive and hold the electrode tab 10 of the winding core 1, and facilitates to weld easily the top end of the hosting portion 31 to the upper end of the electrode tab 10 via laser welding.

The hosting portion 31 may have an open end 35 and a closed end 36, and the connection portion 33 and the open end 35 are coplanar.

The extension part 32 is connected to the first end of the connection portion 33 via a transition part 37, the transition part 37 has a substantially S-shape, and the extension part 32 and the closed end 36 are coplanar. Both front and rear ends of the hosting portion 31 are opened. The transition part 37 and the connection portion 33 are formed integrally. The arrangements of the extension part 32 and the connection portion 33 are reasonable. After assembling, the connection portion 33 is disposed between two adjacent winding cores 1. The extension part 32 extends to the electrode terminal 60 of the cover plate 6 and the extension part 32 is welded to the electrode terminal 60 of the cover plate 6 via laser welding to transmit the current from the two winding cores 1 to the cover plate 6.

In some embodiments of the present disclosure, the electric connector 3 may be connected to the winding core 1 and the cover plate via laser welding.

Figure 5:
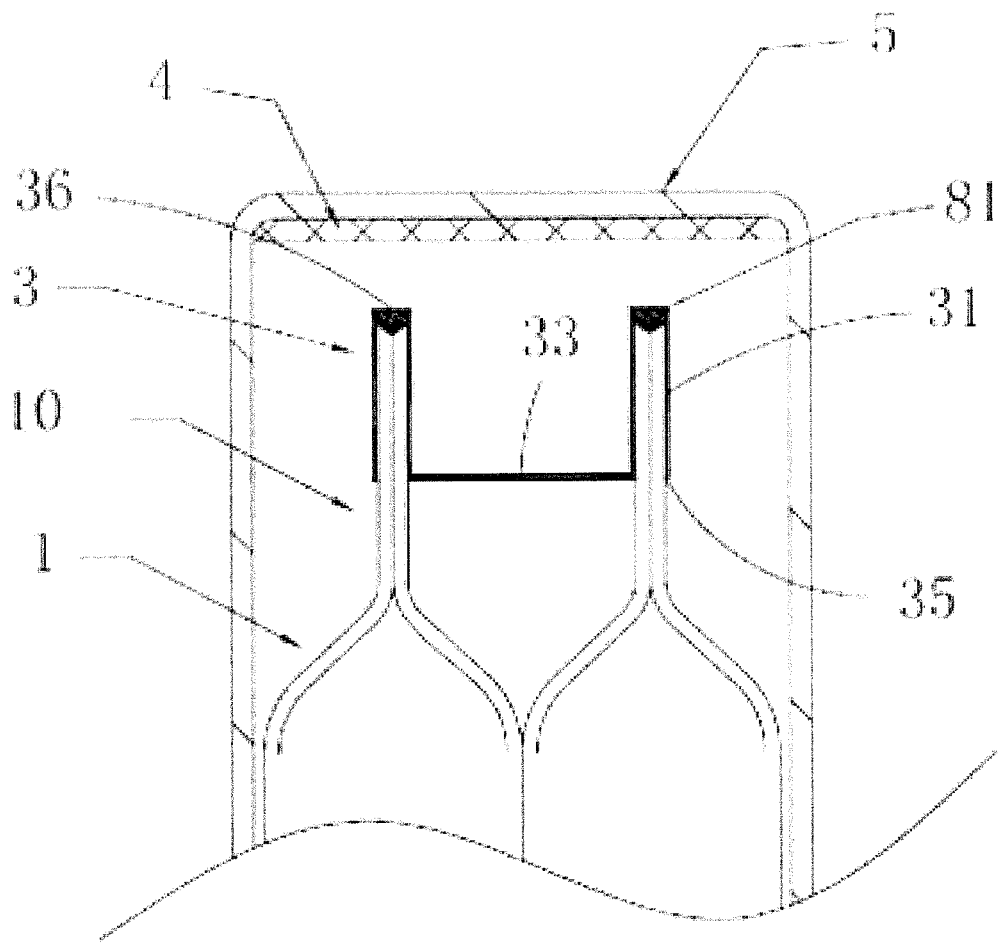
FIG. 5 is a partial cross-sectional view of the battery in FIG. 4.

As shown in FIG. 5, the top surface 36 of the hosting portion 31 may be welded to the upper end of the electrode tab 10 to form a first welding seam 81, and the extension part 32 may be welded to the electrode terminal 60 to form a second welding seam.

Specifically, as shown in FIG. 5, the electric connector 3 may be disposed on electrode tabs 10 of two winding cores 1, the electrode tabs 10 of two winding cores 1 may be plugged in the groove 34 of two hosting portions 31 of the electric connector 3, and then the top surface 36 of the hosting portion 31 may be welded to an upper end of the electrode tab 10 to form the first welding seam 81 for realizing electrical connection between the electric connector 3 and the two winding cores 1.

Figure 6:
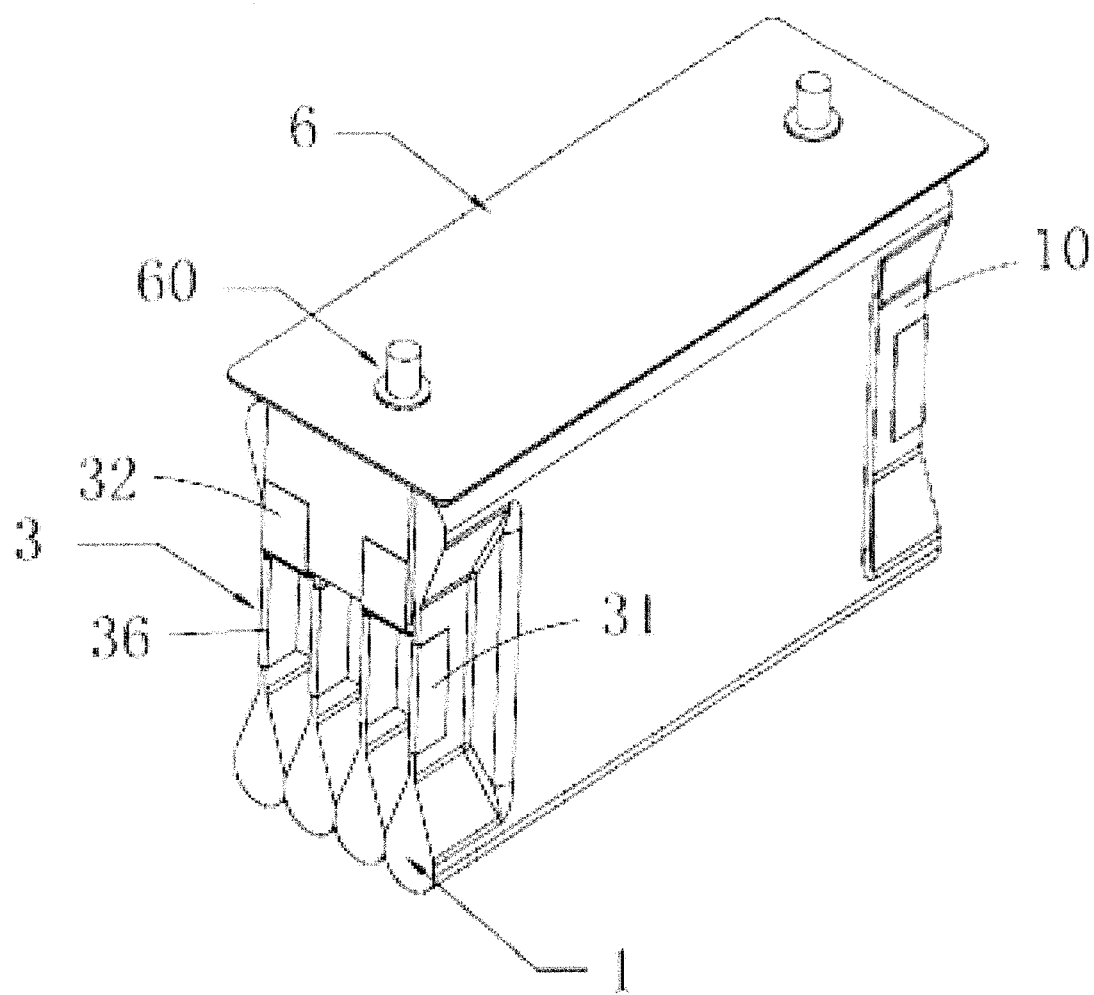
FIG. 6 is a schematic view of a battery according to another embodiment of the present disclosure.

Then, as shown in FIG. 6, the extension part 32 of the electric connector 3 may be welded to the electrode terminal 60 of the cover plate 6 to form the second welding seam to realize electrical connection between the electric connector 3 and the cover plate 6.

In addition, an insulator 4 may be disposed at outside of the winding core 1 and the electric connector 3 to avoid short circuit caused by contacting between electric connector 3 and shell 5. The insulator 4 may be disposed between the shell 5 and the electric connector 3 as well as the electrode terminal 60.

The assembly method of the battery will be described in detail with reference to FIGS. 4-6.

Firstly, the electrode tab 10 may be plugged in the hosting portion 31 of the electric connector 3, and then the electric connector 3 may be welded to the electrode tab 10. An internal tightening clamp may be disposed between the two hosting portions 31 of the electric connector 3, and in order to keep the electrode tab 10 in tightly compressed state, an external compression clamp may be disposed to compress the hosting portion 31 of the electric connector 3 tightly from outside. Therefore, the laser may be prevented from irradiating into the winding core 1 when welding the top end of the electrode tab 10, thus achieving reliable welding.

Secondly, the extension part 32 of the electric connector 3 may be welded to the electrode terminal 60 of the cover plate 6 via laser welding.

Thirdly, the above assembly may be disposed into the shell 5 after the electric connector 3 was welded to the two winding cores 1 and the electrode terminal 60 of the cover plate 6. Therefore, the battery is obtained.

As shown in FIG. 6, according to other embodiment of the present disclosure, a battery may comprise four winding cores 1, and the electric connector 3 may comprise one core fixing part and two extension parts 32 connected to the core fixing part.

The two extension parts 32 may be connected to the electrode terminal 60 of the cover plate 6. The core fixing part may comprise four hosting portions 31 each configured to hold one tab 10 of the corresponding winding core 1, and three connection portions 33 each configured to connect the two adjacent hosting portions 31.

In some embodiments of the present disclosure, the electric connector 3 may comprise four hosting portions 31 and two extension parts 32. The number of the extension part 32 could be changed if necessary, for example, the number of the extension part 32 could be one, or three.

Compared with the structure having three extension parts 32, the structure having two extension parts 32 may be simpler, and the manufacturing cost may be lower. Furthermore, Compared with the structure having only one extension parts 32, for the structure having three extension parts 32, the distance between the four hosting portions 31 are the same, so that it is advantageous to transmit the current from the electric connector 3 to the cover plate 6.

When assembling the electric connector 3, each electrode tab 10 of the four winding cores 1 may be plugged in the corresponding one of the four hosting portions 31 of the electric connector 3, and the top surface 36 of the hosting portion 31 may be welded to the top end of the electric connector 3 via laser welding to form a first welding seam, thus realizing the electrical connection between the electric connector 3 and the four winding cores 1.

Then, the two extension parts 32 of the electric connector 3 may be welded to the electrode terminal 60 of the cover plate 6 via laser welding to form a second welding seam, thus realizing the electrical connection between the electric connector 3 and the electrode terminal 60.

Next, an insulator may be disposed at outside of the winding core 1 and the electric connector 3, and the above assembly may be mounted inside the shell.

Finally, the cover plate may be welded to the shell to form the battery. The battery having four winding cores may have more highly capacity.

According to embodiments of the present disclosure, the electric connector may realize the electrical connection between two or more winding cores and the cover plate, thus increasing the capacity of a battery. Moreover, the structure of the electric connector is simple, the occupancy space thereof is reduced and the electric connector may be easy to be welded. The electric connector of the embodiments of the present disclosure may increase the volume energy density of the battery.

It is appreciated that a connection plate configured to connect with the electric connector 3 may be disposed on the cover plate 6. The connection plate and the electrode terminal may be formed integrally, or manufactured separately and then welded together. When the battery comprises four winding cores, the four winding cores can be connected via either two electric connectors 3 each having two hosting portions or one electric connector 3 having four hosting portions. If the battery comprises much more winding cores, the winding cores may be connected via a corresponding number of electric connectors 3, or one electric connector having corresponding numbers of hosting portions, extension parts and connection portions.

The electric connector 3 according to embodiments of the present disclosure may be manufactured into a standard member which has a simple structure and is easy to weld. The electric connector 3 according to embodiments of the present disclosure may have relatively small occupancy space, which is advantageous for the increasing of the volume energy density of a battery.

According to embodiments of the present disclosure, the electric connector and the battery comprise the same may have the following advantages:

1. The electrical connection piece in the prior art can be welded to only one winding core. The electric connector according to embodiments of the present disclosure may be welded to at least two winding cores, and has a simple structure, and the occupancy space thereof is reduced. It may be easy to weld the electric connector to the winding core and cover plate, thus avoiding sealing-off and false welding. Furthermore, capacity and capacity density of the battery may be increased.

2. The electrical connection piece in the prior art can be welded to the electrode tab of winding core only by ultrasonic welding. The electric connector according to embodiments of the present disclosure may be welded to the electrode tab of winding core by laser welding, which could reduce the material consumption and the metal dust caused by ultrasonic welding. Moreover, the top surface of the hosting portion is welded to the end of the electrode tab, so that the area of the electrode tab occupied on the winding core is reduced, thus increasing the volume energy density of a battery.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An electric connector, comprising:
   a core fixing part, the core fixing part further including at least two hosting portions, each configured to hold an electrode tab of a winding core of a battery, respectively, and an elongated connection portion having two parallel edges in the elongated direction and configured to connect the two hosting portions disposed along the two parallel edges of the connection portion; and
   an extension part connected to the connection portion via a substantially S-shape transition part, wherein the extension part defines a plane that is substantially parallel to a plane defined by the connection portion.

2. The electric connector of claim 1,
   wherein the extension part is disposed at a first end of the two parallel edges of the connection portion.

3. The electric connector of claim 1, wherein each of the hosting portions has a substantially U-shaped cross section so as to define a groove to receive and hold the electrode tab of winding core.

4. The electric connector of claim 1, wherein the hosting portion has an open end and a closed end,
   wherein the connection portion and the open end are coplanar, and
   wherein the extension part is connected to the first end of the connection portion via the transition part, and the extension part and the closed end are coplanar.

5. The electric connector of claim 4, wherein both front and rear ends of the hosting portion are opened.

6. The electric connector of claim 1, wherein the extension part, the transition part and the connection portion are one integral piece.

7. The electric connector of claim 1, wherein the electric connector is made by an elastic sheet.

8. The electric connector of claim 7, wherein a thickness of the elastic sheet is about 0.1 mm to about 3 mm.

9. A battery, comprising:
   a shell;
   a cover plate connected to the shell so as to define an inner space therebetween;
   electrode terminals disposed on the cover plate;
   at least two winding cores received in the inner space and each having a non-coated region configured as an electrode tab and a coated region; and
   an electric connector, the electric connector further including:
      a core fixing part, the core fixing part further including at least two hosting portions, each configured to hold an electrode tab of a winding core of a battery, respectively, and an elongated connection portion having two parallel edges in the elongated direction and configured to connect the two hosting portions disposed along the two parallel edges of the connection portion; and
      an extension part connected to the connection portion via a substantially S-shape transition part, wherein the extension part defines a plane that is substantially parallel to a plane defined by the connection portion;
   wherein each electrode tab of the winding cores is received in a corresponding hosting portion of the core fixing part respectively, and each extension part of the electric connector is connected to the electrode terminal respectively.

10. The battery of claim 9, wherein the electrode terminals comprise a negative electrode terminal and a positive electrode terminal, wherein the electrode tabs of the at least two winding cores comprises a negative electrode tab disposed adjacent to the negative electrode terminal and a positive electrode tab disposed adjacent to the positive electrode terminal, and wherein the electric connector is connected between the negative electrode tab and the negative electrode terminal and/or between the positive electrode tab and the positive electrode terminal.

11. The battery of claim 9, wherein the top surface of the hosting portion is welded to an upper end of the electrode tab, and the extension part is welded to the electrode terminal.

* * * * *